United States Patent
Lass et al.

(10) Patent No.: US 8,515,019 B2
(45) Date of Patent: *Aug. 20, 2013

(54) TELEPHONE SYSTEM AND METHOD FOR RELIABLE EMERGENCY SERVICES CALLING

(75) Inventors: Steven L Lass, Farmers Branch, TX (US); John Kenneth Gallant, Plano, TX (US); John L Truetken, McKinney, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 531 days.

This patent is subject to a terminal disclaimer.

(21) Appl. No.: 12/579,516

(22) Filed: Oct. 15, 2009

(65) Prior Publication Data

US 2010/0046722 A1  Feb. 25, 2010

Related U.S. Application Data

(63) Continuation of application No. 11/427,235, filed on Jun. 28, 2006, now Pat. No. 7,643,618, which is a continuation of application No. 10/157,371, filed on May 29, 2002, now Pat. No. 7,103,151.

(60) Provisional application No. 60/373,993, filed on Apr. 19, 2002.

(51) Int. Cl.
  *H04M 11/00*  (2006.01)
(52) U.S. Cl.
  USPC ........................... 379/45; 379/37; 379/221.01

(58) Field of Classification Search
  USPC ............... 379/37–45, 90.01, 93.15; 370/410, 370/401, 352; 709/227, 225
  See application file for complete search history.

(56) References Cited

U.S. PATENT DOCUMENTS

| | | | |
|---|---|---|---|
| 5,388,145 A | 2/1995 | Mulrow et al. |
| 5,479,482 A | 12/1995 | Grimes |
| 5,940,479 A | 8/1999 | Guy et al. |
| 6,061,450 A | 5/2000 | Bauer et al. |
| 6,141,341 A | 10/2000 | Jones et al. |
| 6,151,629 A | 11/2000 | Trewitt |
| 6,212,260 B1 | 4/2001 | Baum et al. |

(Continued)

FOREIGN PATENT DOCUMENTS

| | | |
|---|---|---|
| GB | 2278756 | 12/1994 |
| JP | 8-32652 | 2/1996 |
| JP | 11-220549 | 8/1999 |

OTHER PUBLICATIONS

Baker, "Speaking in Future Tense", WorldCom, Inc. http://www1.worldcom.com/us/resources/digitalsource/2001Q3/future-tense.xml, © 2002.

(Continued)

*Primary Examiner* — Melur Ramakrishnaiah

(57) ABSTRACT

A method of routing a telephone call includes receiving an indication, at a handset device 112, to initiate a telephone call. It is then determined, preferably by the handset device 112, whether the telephone call is an emergency services telephone call. If the telephone call is not an emergency services telephone call, it is routed to a proxy server 134. On the other hand, if the telephone call is an emergency services telephone call, it is routed to a local gateway 116 without first accessing the proxy server 134.

20 Claims, 1 Drawing Sheet

(56) References Cited

U.S. PATENT DOCUMENTS

| | | | |
|---|---|---|---|
| 6,240,285 B1 | 5/2001 | Blum et al. | |
| 6,275,574 B1 | 8/2001 | Oran | |
| 6,298,119 B1 | 10/2001 | Shaffer et al. | |
| 6,363,065 B1 * | 3/2002 | Thornton et al. | 370/352 |
| 6,614,883 B2 * | 9/2003 | Baum et al. | 379/37 |
| 6,785,267 B1 * | 8/2004 | Knappe | 370/353 |
| 6,842,447 B1 | 1/2005 | Cannon | |
| 6,853,713 B1 | 2/2005 | Fobert et al. | |
| 6,891,819 B1 * | 5/2005 | Inoue et al. | 370/338 |
| 6,990,328 B2 * | 1/2006 | Crandall et al. | 455/404.1 |
| 2002/0065063 A1 * | 5/2002 | Uhlik et al. | 455/404 |

OTHER PUBLICATIONS

Handley et al., SIP: Session Initiation Protocol, © The Internet Society, http:www.ietf.org/rfc/rfc2543.txt?number=2543, Mar. 1999, pp. 1-143.

Schulzrinne, "Emergency Call Services for SIP-Based Internet Telephony", Internet Engineering Task Force: Internet Draft, htto://search.ietf.org/internet-drafts/draft-schulzrinne-sip911-01.txt, Mar. 25, 2001.

* cited by examiner

TELEPHONE SYSTEM AND METHOD FOR RELIABLE EMERGENCY SERVICES CALLING

RELATED APPLICATIONS

This application is a continuation of U.S. patent application Ser. No. 11/427,235 filed Jun. 28, 2006, which is a continuation of U.S. patent application Ser. No. 10/157,371 filed May 29, 2002, now U.S. Pat. No. 7,103,151, which claims priority under 35 U.S.C. 119 based on U.S. Provisional Application No. 60/373,993, filed Apr. 19, 2002, the entire disclosures of which are incorporated herein by reference.

FIELD OF THE INVENTION

This invention relates generally to communication systems and more specifically to a telephone system and method for reliable emergency services calling.

BACKGROUND OF THE INVENTION

The proliferation of data transport networks, most notably the Internet, is causing a revolution in telephony and other forms of real-time communication. Businesses that have been accustomed to having telephony traffic and data traffic separately supported over different systems and networks are now moving towards so-called "converged networks." In these networks, telephone voice traffic and other forms of real-time media are converted into digital form and carried by a packet data network along with other forms of data. Now that the technologies are feasible to support converged networks, voice over data transport offers many advantages in terms of reduced capital and operating costs, resource efficiency and flexibility.

To meet the demand for voice over data transport, service providers and network equipment vendors are faced with the challenges of establishing new protocols and standards, recognizing new business models, implementing new services, and designing new equipment in a way that would have been difficult to imagine twenty years ago. For example, a new generation of end user terminal devices are now replacing the traditional telephones and even the more recent PBX phone sets. These new sets, such as those offered by Cisco Systems Inc. and Pingtel Corporation, may connect directly to a common packet data network, via an Ethernet connection for example, and may feature large visual displays to enhance the richness of the user interface.

Even before such devices were developed, computers equipped with audio adapters and connected to the Internet have been able to conduct some rudimentary form of Internet telephony, although the quality was unpredictable and often very poor. The emphasis now is upon adapting Internet Protocol (IP) networks and other packet transport networks to provide reliable toll-quality connections, easy call set-up and enhanced features to supply full-featured telephony as well as other forms of media transport. Some other types of media sessions enabled by such techniques may include video, high quality audio, multi-party conferencing, messaging and collaborative applications.

Of course, as a business or residential communications subscriber begins using such voice-over-packet communications to replace conventional telephony, there will naturally be an expectation that the quality of the connections and the variety of services will be at least as good as in the former telephone network. People have grown accustomed to having a telephone connection available whenever it is necessary. This is especially true in the case of emergencies where having an available telephone line can be most critical.

SUMMARY OF THE INVENTION

Embodiments of the present invention relate to emergency services notification. In voice-over-IP systems, for example, the ability to reach emergency services, such as by using the well known "9-1-1" dialing sequence, must be supported by a packet voice system. As with a conventional telephone system, the availability of emergency services by phone in a voice-over-IP system is expected to be robust to catastrophic events, such as natural disasters or military attacks.

One preferred embodiment of the present invention relates to ensuring that special, services, such as emergency or "911" services, are available even when some elements and functions in the service-providing network become unavailable. Such unavailability may be caused by damage to equipment, power outages, or damage to communications links, for example, in the case of a natural disaster. Network unavailability may also be caused by increased demands for service as large numbers of people attempt to place calls into and out of an affected area.

New voice-over-packet networks may require special measures to ensure availability of emergency services, even when conventional services are impacted. For example, where essentially all of the call processing and routing logic resides in the service providing network rather than a customer premise, it may be necessary to provide for routing of emergency calls even when the customer premise is disconnected from the service-providing network. The preferred embodiment of the present invention provides for this capability.

In accordance with a preferred embodiment, the present invention provides for a customer premise with direct access to a network gateway that interfaces to a Class 5 end office switch in the public switched telephone network (PSTN). Each phone at the customer premise includes a provisionable feature for detecting the dialing of an emergency number and addressing the session setup request to the local network gateway rather a proxy server residing in a service providing network. In this manner, the customer premise phones may be provisioned to differentiate emergency calls and bypass the voice-over-packet core network entirely. The customer premise phones are thus no longer dependent upon the reaching the voice-over-packet network to enable emergency services.

In one aspect, the present invention provides a method of routing a telephone call originating at a local customer premise. A handset device receives an indication to initiate a telephone call. It is then determined, preferably by the handset device, whether the telephone call is an emergency services telephone call. If the telephone call is not an emergency services telephone call, it is routed to a proxy server. On the other hand, if the telephone call is an emergency services telephone call, it is routed to a local gateway without first accessing the proxy server.

In one embodiment of the present invention, a dialing "string" at the phone may be freely mapped to any actual emergency number applicable to the region where the phone is located. In other words, if a customer premise is located in an area where "911" dialing is not supported, phones may be nevertheless provisioned such that dialing of "9-1-1" reaches the applicable 7- or 10-digit emergency telephone number for the area.

Aspects of the present invention provide a number of advantages. For example, because emergency services telephone calls are not dependent upon the IP network, performance issues related to the network can be avoided. As an example, if a cut line isolates the local network from the proxy server, an emergency services telephone call can still be completed

BRIEF DESCRIPTION OF THE DRAWINGS

The features of the present invention will be more clearly understood from consideration of the following descriptions in connection with accompanying drawings in which.

DETAILED DESCRIPTION OF ILLUSTRATIVE EMBODIMENTS

The making and use of the various embodiments are discussed below in detail. However, it should be appreciated that the present invention provides many applicable inventive concepts that can be embodied in a wide variety of specific contexts. The specific embodiments discussed are merely illustrative of specific ways to make and use the invention, and do not limit the scope of the invention.

Figure 1:
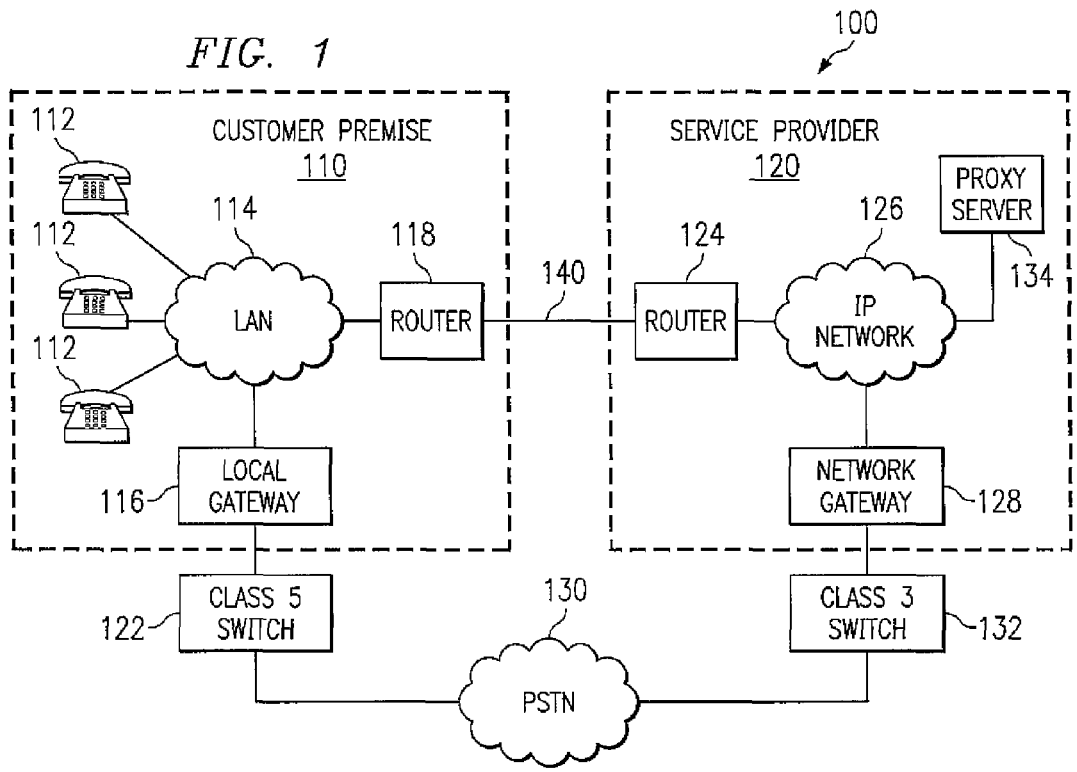
FIG. 1 is a block diagram showing a telecommunications system.

A preferred embodiment of the present invention will now be described with reference to the figures. FIG. 1 shows a preferred system 100 that can be modified to include aspects of the present invention. Telecommunications system 100 includes both customer premise portion 110 and a service provider portion 120. The customer premise portion 110 is typically located at a customer site, i.e., the place where the telephone service is provided. The customer location may be a single building, a campus of buildings, or other configurations depending upon the particular user. In some cases, the customer premise portion 110 could also include a number of remotely located facilities that utilize commonly shared network resources. Typically the customer premise portion 110 is outside the control of the telecommunications service provider.

A telecommunications service provider typically operates the service provider portion 120. The service provider portion 120 is typically connected to many different customers and includes a telecommunications backbone. The service provider network 120 can be national or even international, having the ability to connect users globally. For the purposes of this discussion, the description will focus on the portion of the network that interfaces with customer premise 110.

Referring to the customer premise portion 110, a number of telephones or handsets 112 are provided. These handsets 112 are provided to allow users at the customer premise 110 to communicate as is necessary in their business or otherwise. Telephones 112 are preferably IP telephones, that is, they communicate using Internet Protocol packets. A typical embodiment could use IP telephones such as those commercially available from Cisco Systems Inc. or Pingtel Corporation, as modified in accordance with the descriptions provided here. In another embodiment, telephone 112 could comprise an analog telephone coupled to a converter that generates the packets.

Each of the handsets 112 is coupled to a local area network (LAN) 114. LAN 114 can be configured in any manner that is appropriate to connect a number of devices using a common protocol, such as Internet Protocol. LAN 114 can include a number of devices, such as routers, servers, and computers, besides those that are shown in the figure. In a typical embodiment, the LAN 114 can connect many telephones.

One of the elements coupled to LAN 114 is local network gateway 116. This local gateway 116 cold be on customer premises or it could be off customer premises. One of the purposes of local gateway 116 is to provide connectivity to the public switched telephone network (PSTN) 130 through an element such as Class 5 switch 122.

FIG. 1 also shows a router 118, which can be used to connect to the service provider 120. While router 118 is shown as the only element that connects the local customer premise network 110 to the service provider IP network 126, it is understood that other paths may also exist. These paths preferably use a packet-based protocol such as IP. An advantage of having LAN 114 use the same protocol as the service provider 120 is that the local network will appear to have all the features of the service provider network. This provides a cost effective way to provide a vast array of services that might otherwise not be affordable to a small or even medium sized customer.

The service provider IP network 126 includes a number of circuit elements such as routers, servers and other devices, only a few of which are shown in the figure. For example, a router 124 is shown as an example of an entry point of messages from LAN 114, e.g., through router 118. It is understood that different paths of entry may be present and other elements that are not shown could be included in the path.

The IP network 126 couples different elements and services. For example, network gateway 128 provides a path to PSTN 130. In a typical configuration, network gateway 128 is connected to a Class 3 switch. As is known, Class 3 switches provide much of the backbone of the PSTN 130. Since the service provider 120 routes a large amount of traffic through to the PSTN, it is cost effective to couple directly to a Class 3 switch. Alternatively, a Class 4 or a Class 5 switch could replace Class 3 switch 132. Also, it is understood that the service provider may have numerous gateways 128 to the PSTN 130.

FIG. 1 also illustrates a proxy server 134. These devices provide the function of routing the telephone calls through the most efficient and cost-effective portions of the network. In a typical embodiment, the server 134 would comprise a high power computer, such as a multiprocessor computer, coupled to a database storage system.

To understand some of the advantages of the present invention, it is usefull to first describe the operation of the network. To place a telephone call, a user picks up a handset 112. Upon receipt of a dial tone, the user dials the telephone number. In other embodiments, the handset 112 could be voice activated or be coupled through a keyboard of a computer, as examples. These variations, as well as others, are all included within the scope of the present invention.

The handset 112 routes a setup message to the proxy server 134. The proxy server 134 authenticates to verify the person and includes routing information from which it looks up the dialed digits. For example, the proxy server 134 will determine if the phone number is a long distance number, is a local number, or is a PBX extension, as examples.

The system then routes the call as appropriate. For example, if the call is a long distance call, it could be routed to the PSTN through network gateway 128 and Class 3 switch 132. If the dialed number is a local number, it might be routed through the network gateway 128 to complete that call. It might be less expensive, however, to route the call through local gateway 116. For example, a call that is routed through a local gateway that is connected to the Class 5 of that same area code, the charges would likely be less. In other words, once the call begins, the media stream will be routed directly from the handset 112 to local gateway 116.

Emergency services, e.g., "911" calls, could be treated in the same manner. When an emergency service is needed, the user would dial the sting "9-1-1." A setup message would then be routed to the proxy server 134, which would in turn cause the call to be routed to local gateway 116. For the purpose of this invention, authentication at the proxy is an optional step. In other words, the proxy server 134 could examine the dialed string and determine that it is an emergency string and forgo authentication. The PSTN 130, in areas that include 911 services, is adapted to specially route the call to the proper authorities so that a response can be made.

One goal of the preferred embodiment of the present invention is to make emergency services as reliable as possible. There are a number of things that could go wrong that would cause reliability issues. For example, the line 140 connecting the customer premise 110 to the service provider 120 could fail. In some cases, a business or community may have only one physical line, e.g., a T1 data link or links or a fractional T3 link leaving the premise. If this one line is damaged for any reason, the LAN 114 will lose connectivity to IP network 126.

In another example, there may be problems with the service provider's network. Preferably, the network 126 includes redundancy, it would not be uncommon to have hundreds of different paths between elements. In this case, it would be unlikely that a router failure could cause connectivity to be lost. In the case of a natural disaster or other large-scale emergency, however, the network could become overwhelmed, with people trying to call into and out of the affected area. Therefore, it would be useful to have an alternate treatment of emergency services calls.

In a preferred embodiment, these problems are avoided by having the handset 112 recognize an emergency services call and route that call directly to the PSTN 130 through the local gateway 116. No provisioning is performed at the proxy server 134. In this manner, reliance on the proxy server 134 (or similar domain name servers) is removed. The call can be routed even if the IP network 126 is inaccessible.

If for some reason the local gateway is down, then the call can be routed through the IP network 126. For example, using network gateway 128 as a connection point to the PSTN 130 could still complete the call.

Another problem exists in areas that do not have 911 services. In those places, the user would need to dial the necessary emergency telephone number or numbers to reach the police, fire department, ambulance or whichever other service is necessary. In other words, people would need to learn at least one and maybe mote telephone numbers. In an emergency, however, it may be difficult to remember these numbers or to look them up.

To solve this problem, the present invention includes an embodiment where the handset 112 (or the gateway 116) can receive a dialed sting of "9-1-1" and map that string into a valid emergency services telephone number for that particular area. With this feature, the user will be presented with a scenario that appears the same as those locales that have implemented 911 services.

Figure 2:
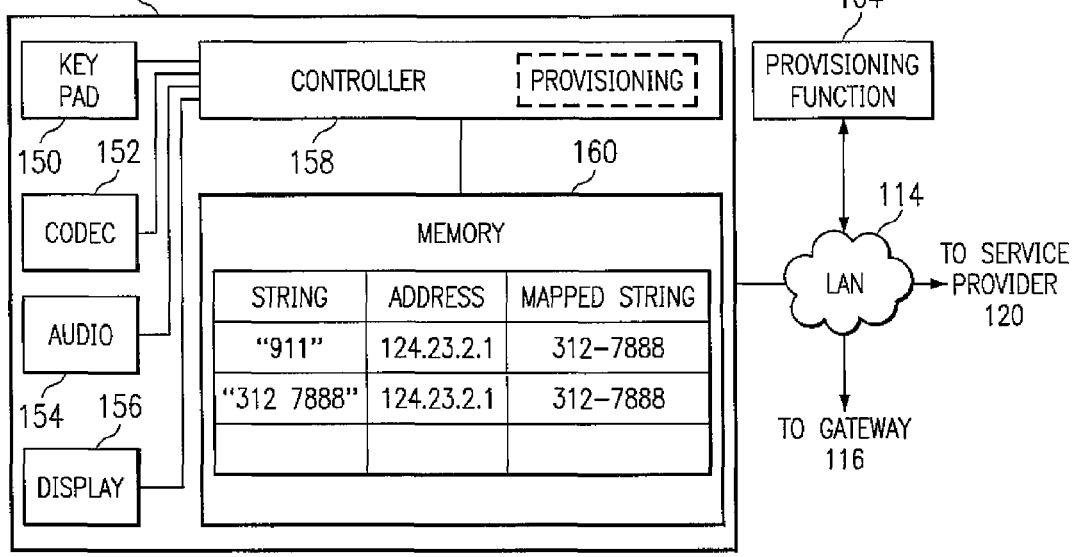
FIG. 2 is a block diagram of an exemplary telephone that can be utilized with the system.

FIG. 2 provides a block diagram of an exemplary handset 112 that could be used with the present invention. The handset 112 would include a user interface so that the user could use the telephone. As with many telephones, the user interface could include a speaker, a microphone, a keypad and a display. These user interface features are presented in the figure by the blocks 150, 152, 154 and 156, respectively labeled keypad, codec, audio and display.

The handset 112 also includes a controller 158 that can perform, among other things, a provisioning procedure. The controller 158 couples to each of the other elements in the phone 112 to provide overall control of the system.

The handset 112 also includes a memory 160 that may be adapted to store a table that includes an indication of an emergency services telephone call and a destination address corresponding with the emergency services telephone call. In a preferred embodiment, the table also includes a mapped string that provides the emergency services telephone number for that particular locale. The memory 160 is preferably a non-volatile memory such as flash memory or a non-volatile RAM (e.g., DRAM or SRAM with its own battery).

In the illustrated example, the table includes two entries. The first entry is a dialed string "9-1-1." In the United States this number is often used for emergency services. Other countries may use other strings such as "0-0-0" Australia or "1-1-0" or "1-1-2" in European Community countries. The table also stores the IP address corresponding to the local network gateway. In this case, the IP address is 124.23.2.1, which is assumed to be the address of gateway 116. The third entry on this row is the telephone number for local emergency services. In some cases, this could simply be "911." In the illustrated example, however, the emergency services telephone number is "312-7888." This telephone number is typically a local seven-digit or ten-digit number.

In the case where the local emergency services number is not "911," the table also preferably includes an entry for the local emergency services number. In this particular example, a dialed string of "3-1-2-7-8-8-8" will be mapped into 312-7888 and routed to the local gateway 116, which is at IP address 124.23.2.1. For international compatibility, one emergency services number could be mapped into another. For example, a telephone being used in Germany where the emergency services number is "110" can have a dialed string of "9-1-1" mapped into "110."

While the emergency services calls are routed directed to the local gateway 116, all other calls can be routed to proxy server 134 (FIG. 1). In other embodiments, other calls, e.g., internal extensions, can also be routed without use of the proxy server 134.

FIG. 2 also shows a provisioning function 164 which can be performed from some device connected to LAN 114. The provisioning device 164 can be used to set the values within the mapping table 160. In a typical embodiment, the user of the telephone does not know the IP address of the local gateway (or likely even the existence of a local gateway). Rather, the system administrator is typically responsible for maintaining the table in memory 160. This maintenance can be performed remotely by use of provisioning device 164, a device which is located at the local customer premise 110.

The present invention has thus far been discussed in the context of emergency services. It should be understood, however, that these concepts could be applied to other circumstances where it is desirable for a particular telephone call to be treated differently than other calls. For example, a specific user could be given the option to map telephone calls for specific uses, e.g., a family member, boss, or stockbroker.

One specific example of another use would be to report outages of the telecommunications system. For example, if link 140 (FIG. 1) between the customer premise portion 110 and the service provider portion 120 is not functioning, then the customer could not use the system to notify the service provider. In this case, the customer could use a special service provider number (or use a specialized button or command on the handset) for service notification. This number could be cause the system to bypass the link 140 and route the call to the service provider through gateway 116.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving, at a telephony device, a call indication;
   searching, by the telephony device, a memory of the telephony device for an entry corresponding to the call indication;
   determining, by the telephony device, whether to route a telephone call to a local gateway coupled to a first network or to a proxy server coupled to a second network based on searching the memory for the entry corresponding to the call indication; and
   routing, by the telephony device, the telephone call from the telephony device to the local gateway coupled to the first network without first accessing the proxy server coupled to the second network when the memory includes the entry corresponding to the call indication.

2. The method of claim 1, where the first network includes a public switched telephone network (PSTN), and where the second network includes an Internet Protocol (IP) network.

3. The method of claim 1, where the telephony device communicates using Internet Protocol (IP) packets.

4. The method of claim 1, where the telephony device comprises an analog telephone coupled to a converter that generates Internet Protocol (IP) packets.

5. The method of claim 1, where the telephony device is to be communicatively coupled to the second network when the telephone call is to be routed to the proxy server.

6. The method of claim 1, where the telephony device is communicatively coupled to the second network.

7. The method of claim 6, where the telephony device is communicatively coupled to the proxy server through the second network.

8. The method of claim 1, where the memory includes a listing of call indications that trigger routing of the telephone call to the local gateway.

9. The method of claim 8, where one or more of the call indications in the listing include an Internet Protocol (IP) address of the local gateway.

10. The method of claim 8, where each of one or more of the call indications in the listing include a mapped string corresponding to the call indication, where the information in the mapped string is output by the local gateway in response to receipt of the corresponding call indication.

11. The method of claim 10, where the mapped string matches the call indication.

12. A telecommunications device, comprising:
    an interface to receive a call indication from a user;
    a memory; and
    a controller to:
      search the memory for an entry corresponding to the received call indication,
      determine, based on searching the memory for the entry corresponding to the received call indication, whether to route a telephone call to a local gateway or to a proxy server, and
      route the telephone call directly to the local gateway upon determining that memory includes the entry corresponding to the call indication.

13. The telecommunications device of claim 12, further comprising:
    a first interface communicatively coupled to the local gateway; and
    a second interface configured to communicatively couple to a second network that includes the proxy server.

14. The telecommunications device of claim 13, where the second network includes an Internet Protocol (IP) network.

15. The telecommunications device of claim 13, where the first network includes a public-switched telephone network (PSTN).

16. The device of claim 12, where the memory is to store a listing of call indications relating to a particular type of call, where the controller is further to:
    search the memory for a listing corresponding to the received call indication,
    determine, based on searching for the listing, whether the received call indication relates to the particular type of call, and
    route the telephone call to the local gateway when the received call indication relates to the particular type of call.

17. The device of claim 16, where each of one or more of the call indications, in the listing stored in the memory, includes a local gateway Internet Protocol (IP) address.

18. The device of claim 16, where each of the call indications, in the listing stored in the memory, includes an emergency services telephone number and
    where the controller is further to:
      map the received call indication to the emergency services telephone number when the received call indication relates to the particular type of call, and
      output, based on mapping the received call indication, the emergency services telephone number to the local gateway.

19. A telephone system comprising:
    at least one handset to:
      receive an indication of an emergency services telephone call,
      determine whether an IP network is accessible,
      route the emergency services telephone call to a local network gateway operatively coupled to a local area network when the IP network is not accessible,
      the local network gateway being operatively coupled to a circuit-switched network, and
      route the emergency services telephone call to the IP network when the IP network is accessible.

20. The system of claim 19, where the at least one handset is further to:
    determine that the indication is associated with a first emergency services telephone number, and
    map the first emergency services telephone number to a second, different emergency services telephone number.

* * * * *